United States Patent [19]
Telkamp

[11] Patent Number: 6,007,294
[45] Date of Patent: Dec. 28, 1999

[54] APPARATUS FOR HANDLING MOLDED LEADFRAMES AND METHODS THEREFOR

[75] Inventor: Arnold T. M. Telkamp, Velp, Netherlands

[73] Assignee: FiTel Innovations, AE Zevenaar, Netherlands

[21] Appl. No.: 09/005,059

[22] Filed: Jan. 9, 1998

[51] Int. Cl.$^6$ ................................................. B65G 60/00
[52] U.S. Cl. ................... 414/788.4; 414/733; 414/792.9; 414/796.9; 414/801; 414/917; 294/92
[58] Field of Search .................................. 294/81.52, 92; 414/733, 734, 788.4, 792.9, 796.7, 796.9, 801, 802, 917

[56] References Cited

U.S. PATENT DOCUMENTS 3,765,712  10/1973  Hardy et al. ......................... 294/902 X
5,588,795  12/1996  Jäger et al. ........................ 414/788.4 X

FOREIGN PATENT DOCUMENTS 0852418  8/1981  U.S.S.R. .............................. 414/796.9
1366356  1/1988  U.S.S.R. .............................. 414/788.4

Primary Examiner—Janice L. Krizek
Attorney, Agent, or Firm—Harry M. Weiss; Jeffery Weiss; Paul W. Davis

[57] ABSTRACT

Apparatus are shown for handling molded leadframes comprising, in combination, a gripper portion for grasping a molded leadframe from atop a first magazine holding a first plurality of molded leadframes and for releasing the molded leadframe when placed atop a second plurality of molded leadframes in a second magazine, and a mover portion coupled to the gripper portion for moving the gripper portion back and forth in a substantially semicircular motion between the first and second magazines. The mover portion includes a linking member coupled to the gripper portion, a first member rotatably coupled at a first end thereof to the linking member, a second member rotatably coupled at a first end thereof to the linking member, and a driver portion rotatably coupled to an opposite end of each of the first and second members for moving the gripper portion in a back and forth, substantially semicircular motion between the first and second magazines. Note that while the driver portion is shown in two of several possible embodiments, each embodiment of the driver portion includes only a single driver to move the gripper portion back and forth in the substantially semicircular motion.

23 Claims, 2 Drawing Sheets

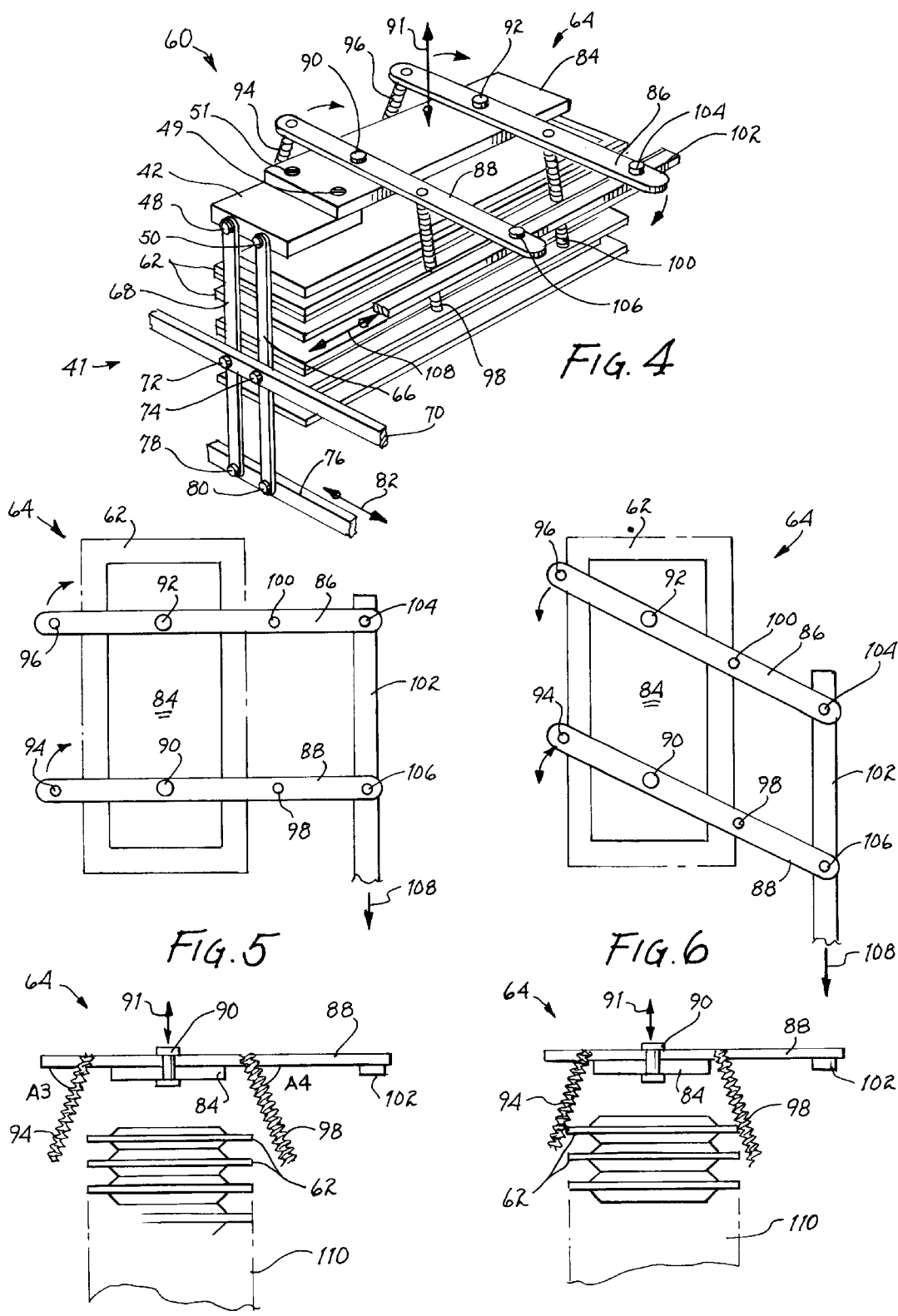

6,007,294

APPARATUS FOR HANDLING MOLDED LEADFRAMES AND METHODS THEREFOR

BACKGROUND OF THE INVENTION

1. Field of the Invention

This invention is in the field of molded leadframes and methods therefore and, more particularly, is an apparatus for handling molded leadframes and a method therefore.

2. Description of the Related Art

Apparatus for handling molded leadframes typically include at least two major functional portions, namely a gripping device and a device for moving the gripping device. The instant invention involves novel advances in at least two primary portions of a molded leadframe handling apparatus, but prior to looking at the advances provided by the instant invention, one needs to understand the state of the art, and its associated shortcomings, with respect to both the moving device and the gripping device portions.

With respect to the moving device portion, apparatus currently implement three or more drivers such as motors. In particular, one has a number of magazines, each for holding a plurality of molded leadframes. A common requirement in handling molded leadframes is the ability to pick up a molded leadframe from one of the magazines and move it over to and place it atop a different magazine. Currently, this process requires three distinct movements. First, the molded leadframe is moved vertically upward in a linear motion away from the first magazine. Then, the molded leadframe is moved linearly to a position directly above a second magazine of molded leadframes. Third, the molded leadframe is moved downward in a linear motion until it is placed and released atop the second magazine of molded leadframes. This process, which implements three distinct motions, requires a total of three separate motors or drivers of considerable expense. It would be advantageous from an economic standpoint to accomplish the desired motion of a molded leadframe with fewer motors. Additionally, this three-step motion is time inefficient. In other words, it takes a relatively long time to move the molded leadframe from one magazine to another using the three-step process. Accordingly, it would be advantageous to effect the desired movement of a molded leadframe using a more fluid and time efficient motion. Therefore, there existed a need to provide a mover portion of a molded leadframe handling apparatus which implements fewer than three motors to move molded leadframes from one magazine to another, thereby saving time and cost.

Focusing now on the current state of gripping device portions in an apparatus for handling molded leadframes, it is important to recognize that the trend in semiconductor devices today is for size to be minimized. Accordingly, the molded leadframe packages enclosing the semiconductor devices are also becoming smaller. When very small, thin molded leadframes are stacked upon each other in a magazine, the clearance between adjacent molded leadframes is extremely small. This makes it nearly impossible to insert conventional grippers between the adjacent molded leadframes in order to remove only the top leadframe from the stack. Thus, it would be advantageous to devise a gripping device portion in an apparatus for handling molded leadframes which smoothly and efficiently removes one molded leadframe at a time from a stack of molded leadframes in a magazine.

Therefore, it is the main focus of the instant invention to integrate the aforementioned advantages to the mover and gripping device portions into an improved apparatus for handling molded leadframes.

SUMMARY OF THE INVENTION

An object of the present invention is to provide improved apparatus for handling molded leadframes and methods therefore.

Another object of the present invention is to provide improved apparatus for handling molded leadframes which include a mover portion implementing a single driver or motor to move a molded leadframe from one magazine to another and methods therefore.

A further object of the present invention is to provide improved apparatus for handling molded leadframes which include a mover portion that moves a molded leadframe from one magazine to another in a substantially semicircular motion and methods therefore.

Still another object of the present invention is to provide improved apparatus for handling molded leadframes which include a gripper portion that smoothly and efficiently removes one molded leadframe at a time from a stack of molded leadframes in a magazine and methods therefore.

BRIEF DESCRIPTION OF THE PREFERRED EMBODIMENTS

According to the present invention, an apparatus is disclosed for handling molded leadframes comprising, in combination, gripper means for grasping a molded leadframe from atop a first magazine holding a first plurality of molded leadframes and for releasing the molded leadframe when placed atop a second plurality of molded leadframes in a second magazine, and mover means coupled to the gripper means for moving the gripper means back and forth in a substantially semicircular motion between the first and second magazines.

The mover means comprises a linking member coupled to the gripper means, a first member rotatably coupled at a first end thereof to the linking member, a second member rotatably coupled at a first end thereof to the linking member, and driver means rotatably coupled to an opposite end of each of the first and second members for moving the gripper means in the back and forth, substantially semicircular motion between the first and second magazines. The driver means comprises a drive member rotatably coupled to the opposite end of each of the first and second members, and a linear driver coupled to the drive member for moving the drive member back and forth in a substantially linear motion. The apparatus further includes a stationary member having a rotatable connection to the first member between the first and the opposite end of the first member, and having a rotatable connection to the second member between the first and the opposite end of the second member.

In an alternative embodiment of the apparatus, the driver means comprises a stationary drive member rotatably coupled to the opposite end of each of the first and second members, a shaft coupled to the opposite end of the first member and extending through an aperture in the stationary drive member, and rotational driver means coupled to the shaft for rotating the shaft back and forth through a semicircular arc of motion. Note that in this embodiment of the apparatus, the aforementioned stationary member is not included.

In either of the aforementioned embodiments of the apparatus, the gripper means comprises a central member coupled to the linking member, a first gripper member rotatably coupled to the central member, a second gripper member rotatably coupled to the central member, first and second pins each having a plurality of grooves and each being coupled to the first gripper member, third and fourth pins each having a plurality of grooves and each being coupled to the second gripper member, and actuating means coupled to the first and second gripper members for moving the first and second gripper members until the first, second, third, and fourth pins grip respective edge portions of the molded leadframe atop the first plurality of molded leadframes in the first magazine, and for moving the first and second gripper members and the first, second, third, and fourth pins to release the respective edge portions of the molded leadframe when placed atop the second plurality of molded leadframes in the second magazine. An end portion of the first gripper member and the first pin form a first acute angle, and an opposite end portion of the first gripper member and the second pin form a second acute angle having a magnitude equal to that of the first acute angle. Similarly, an end portion of the second gripper member and the third pin form a third acute angle having a magnitude equal to that of the first acute angle, and an opposite end portion of the second gripper member and the fourth pin form a fourth acute angle having a magnitude equal to that of the third acute angle.

Again, in either of the aforementioned embodiments of the apparatus, the actuating means comprises an actuating member rotatably coupled near an end portion of each of the first and second gripper members, and actuating member driver means coupled to the actuating member for moving the actuating member back and forth in a substantially linear motion. Additionally, note that in either of the previously identified embodiments of the apparatus, the mover means includes only a single driver to move the gripper means back and forth in the substantially semicircular motion.

In yet another embodiment of the instant invention, a method for handling molded leadframes is disclosed comprising the steps of providing gripper means for grasping a molded leadframe from atop a first magazine holding a first plurality of molded leadframes and for releasing the molded leadframe when placed atop a second plurality of molded leadframes in a second magazine, and providing mover means coupled to the gripper means for moving the gripper means back and forth in a substantially semicircular motion between the first and second magazines.

The step of providing the mover means comprises the steps of providing a linking member coupled to the gripper means, providing a first member rotatably coupled at a first end thereof to the linking member, providing a second member rotatably coupled at a first end thereof to the linking member, and providing driver means rotatably coupled to an opposite end of each of the first and second members for moving the gripper means in the back and forth, substantially semicircular motion between the first and second magazines. The step of providing the driver means comprises the steps of providing a drive member rotatably coupled to the opposite end of each of the first and second members, and providing a linear driver coupled to the drive member for moving the drive member back and forth in a substantially linear motion. The instant method further includes the step of providing a stationary member having a rotatable connection to the first member between the first and the opposite end of the first member, and having a rotatable connection to the second member between the first and the opposite end of the second member.

In an alternative embodiment of the instant method, the step of providing the driver means comprises the steps of providing a stationary drive member rotatably coupled to the opposite end of each of the first and second members, providing a shaft coupled to the opposite end of the first member and extending through an aperture in the stationary drive member, and providing rotational driver means coupled to the shaft for rotating the shaft back and forth through a semicircular arc of motion. Note that in this embodiment of the instant method, the aforementioned stationary member is not included.

In either of the aforementioned embodiments of the instant method, the step of providing the gripper means comprises the steps of providing a central member coupled to the linking member, providing a first gripper member rotatably coupled to the central member, providing a second gripper member rotatably coupled to the central member, providing first and second pins each having a plurality of grooves and each being coupled to the first gripper member, providing third and fourth pins each having a plurality of grooves and each being coupled to the second gripper member, and providing actuating means coupled to the first and second gripper members for moving the first and second gripper members until the first, second, third, and fourth pins grip respective edge portions of the molded leadframe atop the first plurality of molded leadframes in the first magazine, and for moving the first and second gripper members and the first, second, third, and fourth pins to release the respective edge portions of the molded leadframe when placed atop the second plurality of molded leadframes in the second magazine. An end portion of the first gripper member and the first pin form a first acute angle, and an opposite end portion of the first gripper member and the second pin form a second acute angle having a magnitude equal to that of the first acute angle. Likewise, an end portion of the second gripper member and the third pin form a third acute angle having a magnitude equal to that of the first acute angle, and an opposite end portion of the second gripper member and the fourth pin form a fourth acute angle having a magnitude equal to that of the third acute angle.

Once again, in either of the aforementioned embodiments of the instant method, the step of providing the actuating means comprises the steps of providing an actuating member rotatably coupled near an end portion of each of the first and second gripper members, and providing actuating member driver means coupled to the actuating member for moving the actuating member back and forth in a substantially linear motion. Additionally, note that in either of the previously identified embodiments of the instant method, the mover means includes only a single driver to move the gripper means back and forth in the substantially semicircular motion.

The foregoing and other objects, features, and advantages of the invention will be apparent from the following, more particular, description of the preferred embodiments of the invention, as illustrated in the accompanying drawings.

BRIEF DESCRIPTION OF THE DRAWINGS

FIG. 4 is a perspective view of the instant invention showing both the improved mover and gripper portions together. Note that in this view the improved molded leadframe handling apparatus is shown in relation to a stack of molded leadframes which are normally held within a magazine that is not shown here for simplification of the Figure. Also, note that in this view a different embodiment of the mover portion of the apparatus is shown.

FIG. 5 is a simplified planar view of the top of the gripper portion of the apparatus. In this position of the gripper portion, the pins of the gripper portion do not engage a molded leadframe (not shown here).

FIG. 5A is a simplified side planar view of the gripper portion of the apparatus shown in FIG. 5. In this view, one can see that the pins of the gripper portion do not engage the molded leadframe sitting atop a stack of molded leadframes in a magazine.

FIG. 6 is a simplified planar view of the top of the gripper portion of the apparatus. In this position of the gripper portion, the pins of the gripper portion engage a molded leadframe (not shown here).

FIG. 6A is a simplified side planar view of the gripper portion of the apparatus shown in FIG. 6. In this view, one can see that the pins of the gripper portion engage the molded leadframe sitting atop the stack of molded leadframes in the magazine.

DESCRIPTION OF THE PREFERRED EMBODIMENTS

Figure 1:
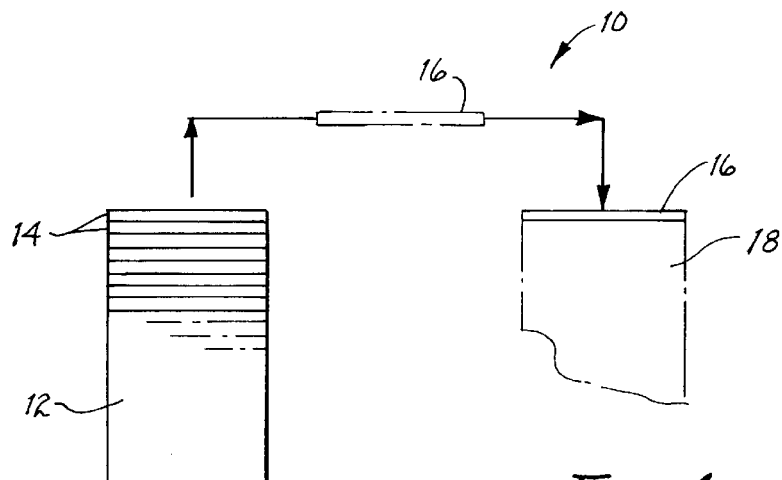
FIG. 1 is a simplified schematic view of the three-step movement executed by a prior art mover portion of a molded leadframe handling apparatus for moving the molded leadframe from one magazine to another.

Referring to FIG. 1, a simplified schematic view 10 is shown of the three-step movement executed by a prior art mover portion (not shown) of a molded leadframe handling apparatus (not shown) for moving a molded leadframe 16 from one magazine 12 to another 18. In particular, the prior art mover portion would move a gripper portion (not shown) to a position slightly above a magazine 12 of molded leadframes 14. The gripper portion would then grasp the molded leadframe 16 from the top of the stack of molded leadframes 14. Next, the mover portion would execute a three-step motion represented by the three arrows in FIG. 1 and consisting of a linear upward motion, a linear side motion to a position above another magazine 18, and a linear downward motion to a position slightly above the stack of molded leadframes (not shown) in magazine 18. Finally, the gripper portion would release the molded leadframe 16, thereby placing it atop the stack of molded leadframes in magazine 18. As previously mentioned, an object of the instant invention is to avoid the temporal and economic disadvantages of this three-step motion by implementing a mover portion which moves a molded leadframe from one magazine of molded leadframes to another in a single and substantially semicircular motion requiring only a single driver.

Figure 2:
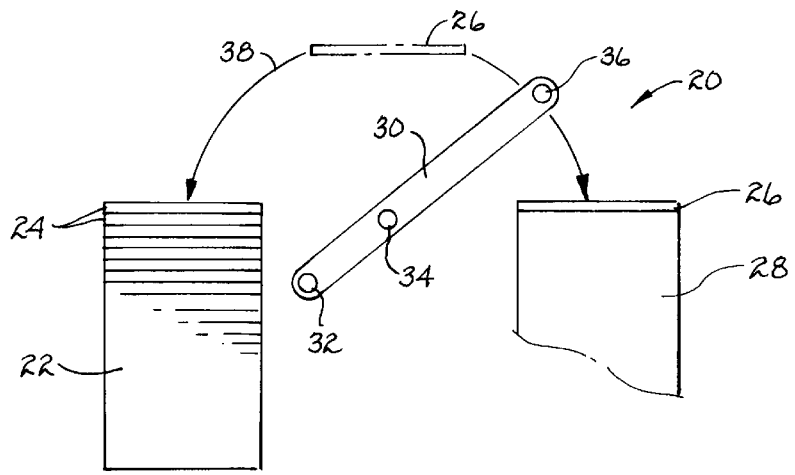
FIG. 2 is a simplified schematic view of the one-step, substantially semicircular movement executed by the mover portion of the instant invention for moving a molded leadframe from one magazine to another.

Referring to FIG. 2, a simplified schematic view 20 is shown of the one-step, substantially semicircular movement 38 executed by the mover portion of instant invention for moving a molded leadframe from one magazine 22 to another 28. In this view, a magazine 22 is shown holding a plurality of molded leadframes 24. Another magazine 28 is shown which can also hold a plurality of molded leadframes. In this Figure, the mover portion is shown in simplified terms. In particular, the mover portion here is shown to consist of a member 30 having three connections 32–36. In the preferred embodiment of the mover portion, a plurality of such members (see FIGS. 3 and 4) are used; however, in FIG. 2 only the single member 30 is shown for the purpose of simplifying the task of showing the semicircular motion 38 implemented by the mover portion. Note however that while the preferred embodiments of the mover portion use two such members, it is conceivable that the single member 30 mover portion could be integrated with the apparatus of the instant invention.

Again turning to FIG. 2, the member 30 is connected to a driver or motor (not shown) via a member (not shown) at a free rotating connection 32. Member 30 is also connected at 34 such that it can rotate about the connection 34. The connection 36 is to a member (not shown) which is connected to the gripper portion (not shown). The connection 36 is also free rotating. Such free rotating connections 32–36 are well known to those skilled in the art, and enable the driver motion at 32 to rotate member 30 about connection 34, thereby moving the connection point 36 and the structure connected to it (not shown) in a substantially semicircular motion 38.

Again referring to FIG. 2, the mover portion places a gripper portion (see FIG. 4) above the stack of molded leadframes 24 in magazine 22. Next, the gripper portion closes to grasp the top molded leadframe 24. The mover and gripper portions are then driven, by the single driver coupled at connection 32, in a substantially semicircular motion 38, thereby positioning the molded leadframe 26 slightly above the stack of molded leadframes (not shown) in magazine 28. Then, the gripper portion releases the molded leadframe 26 atop the stack of molded leadframes in magazine 28, and the gripper portion is moved back in a substantially semicircular motion 38 to a position slightly above the next molded leadframe in the stack of molded leadframes 24 in magazine 22. It is important to note here that the pick up and drop off positions at magazines 22 and 28 remain relatively constant. This is accomplished in magazine 22 by indexing the stack of molded leadframes 24 up by a dimension approximately equal to the thickness of one molded leadframe after the top molded leadframe is removed. Analogously, when a molded leadframe is placed atop the stack of molded leadframes in magazine 28, the stack of molded leadframes therein is indexed downward by approximately the same dimension. Accordingly, the pick up and drop off positions for the gripper portion of the apparatus remain approximately constant. Note that various schemes for indexing stacks of molded leadframes in magazines are well known to those skilled in the art.

Figure 3:
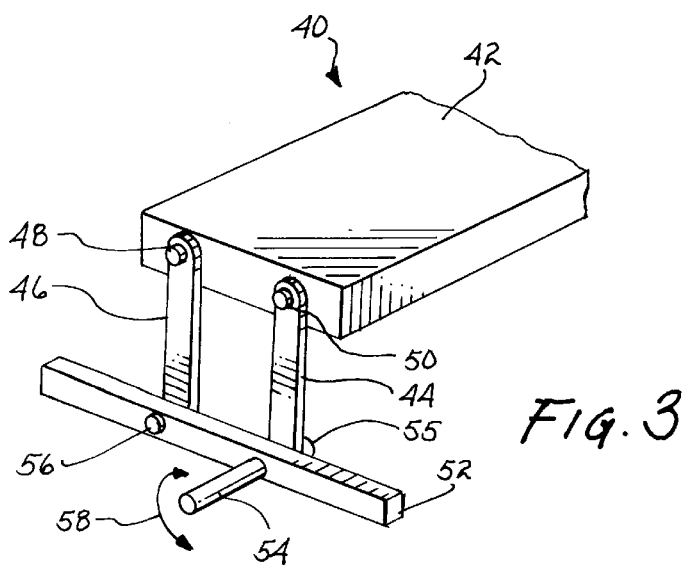
FIG. 3 is a perspective view of one embodiment of the mover portion of the instant invention for moving a molded leadframe from one magazine to another in a single, substantially semicircular motion.

Referring to FIG. 3, a perspective view is shown of one embodiment of the mover portion 40 of the instant invention for moving a molded leadframe from one magazine to another in a single, substantially semicircular motion. Note that in this Figure, the mover portion 40 is shown in isolation from the remainder of the apparatus (see FIG. 4). Also, note that the apparatus as shown in FIG. 4 includes the preferred embodiment of the mover portion for the apparatus, while the mover portion 40 shown in FIG. 3 offers an alternative. The two alternative embodiments for the mover portion of the apparatus perform the same prime task of moving the gripper portion of the apparatus in a substantially semicircular motion between a pair of magazines each holding a stack of molded leadframes. Lastly, note in FIG. 3 the absence of magazines each holding a stack of molded leadframes; they are not shown for the sake of more clearly presenting this embodiment of the mover portion.

With reference again to FIG. 3, the mover portion 40 comprises a linking member 42 coupled to the gripper portion (as shown for the preferred embodiment of the mover portion in FIG. 4), a first member 44 rotatably coupled at a first end 50 thereof to the linking member 42, a second member 46 rotatably coupled at a first end 48 thereof to the linking member 42, and a driver portion rotatably coupled to an opposite end 55 and 56 of each of the first 44 and second 46 members for moving the gripper portion (not shown) in the back and forth, substantially semicircular motion between the first and second magazines (not shown).

In this embodiment of the mover portion 40, the driver portion comprises a stationary drive member 52 rotatably coupled to the opposite end 55 and 56 of each of the first 44 and second 46 members, a shaft 54 coupled to the opposite end 55 of the first member 44 and extending through an aperture in the stationary drive member 52, and a rotational driver portion (depicted by arrows 58) coupled to the shaft 54 for rotating the shaft 54 back and forth through a semicircular arc of motion. The motion provided by rotational driver portion 58 can be created in any one of a number of different manners well known to those skilled in the art. In the preferred embodiment of the rotational driver portion 58, a single motor (not shown) is coupled to the shaft 54 for rotating the shaft 54 back and forth through the semicircular arc of motion. Methods of operating such motors or drivers are well known to those skilled in the art.

Rotating the shaft 54 back and forth through the semicircular arc of motion causes the first 44 and second 46 members, the linking member 42, and the connected gripper portion to move in a like manner. Note that free rotating connections at 48, 50, 55, and 56 make this possible. Also, in this alternative embodiment of the mover portion 40 and in the preferred embodiment of the mover portion shown in FIG. 4, the linking member 42 and the connected gripper portion have large planar surface areas that remain essentially parallel with the ground (not shown) and with the top planar surface of the molded leadframes in the magazines. This result is attainable in any one of a number of methods well known to those skilled in the art such as simply permitting gravity in combination with the free-rotating connections 48, 50, 55, and 56 to establish the desired substantially parallel alignment. Additionally, note that the mover portion 40 is not necessarily shown to scale. In particular, the length of the first 44 and second 46 members could be longer, if desired.

Again referring to FIG. 3, in operation, the mover portion 40 places a gripper portion above a first stack of molded leadframes in a first magazine. Before continuing, note that references to portions of the apparatus other than the mover portion embodiment 40 depicted in FIG. 3 are shown in FIG. 4. Additionally, note that anywhere that a group of magazines are mentioned, FIG. 2 depicts a plurality of magazines 22 and 28 each retaining, or at least capable of retaining, a stack 24 of molded leadframes. Continuing, the gripper portion next closes to grasp the top molded leadframe. The mover 40 and gripper portions are then driven, by the single driver coupled at shaft 54, in the substantially semicircular motion, thereby positioning the molded leadframe slightly above a second stack of molded leadframes in a second magazine. Then, the gripper portion releases the molded leadframe atop the second stack of molded leadframes in the second magazine, and the gripper portion is moved back in the substantially semicircular motion to a position slightly above the next molded leadframe in the first stack of molded leadframes in the first magazine. It is important to note again here that the pick up and drop off positions at the first and second magazines remain relatively constant, and this remains true for each embodiment of the apparatus based on indexing schemes, as discussed above. Note here too that when semicircular motion of the mover portion 40 is mentioned, this means, more specifically, that the linking member 42, which is coupled to the gripper portion, moves in the substantially semicircular motion. While other parts of the mover portion 40 also move in a semicircular manner, such as the first 44 and second 46 members and the shaft 54, it is the semicircular motion of the linking member 42 which is of primary concern because this motion ultimately moves the gripper portion and any attached molded leadframe.

Referring to FIG. 4, a perspective view is shown of the instant invention 60 showing both the improved mover 41 and gripper 64 portions together. The mover portion 41 here, as opposed to the mover portion 40 shown in FIG. 3, is the preferred embodiment of the mover portion 41 for the apparatus 60 for handling molded leadframes (hereafter more simply referred to as apparatus 60); however, as those skilled in the art realize, the alternative embodiment of the mover portion 40 shown in FIG. 3 could be implemented in lieu of the preferred embodiment mover portion 41 in FIG. 4.

The apparatus 60 comprises, in combination, a gripper portion 64 for grasping a molded leadframe 62 from atop a first magazine (not shown here but see FIG. 2) holding a first plurality of molded leadframes 62 and for releasing the molded leadframe 62 when placed atop a second plurality of molded leadframes (not shown) in a second magazine (not shown), and a mover portion 41 coupled to the gripper portion 64 for moving the gripper portion 64 back and forth in a substantially semicircular motion between the first and second magazines (as shown in FIG. 2).

The preferred embodiment of the mover portion 41 comprises a linking member 42 coupled to the gripper portion 64, a first member 66 rotatably coupled at a first end 50 thereof to the linking member 42, a second member 68 rotatably coupled at a first end 48 thereof to the linking member 42, and a driver portion rotatably coupled to an opposite end 80 and 78 of each of the first 66 and second 68 members for moving the gripper portion 64 in the back and forth, substantially semicircular motion between the first and second magazines. The driver portion comprises a drive member 76 rotatably coupled to the opposite end 80 and 78 of each of the first 66 and second 68 members, and a linear driver coupled to the drive member 76 for moving the drive member 76 back and forth in a substantially linear motion. Note that the linear driver is represented by the bi-directional arrow 82 demonstrating the substantially linear, reciprocating motion applied to the drive member 76. It is well known to those skilled in the art how to provide such substantially linear, reciprocating motion, such as coupling a pneumatic piston-cylinder driver to the drive member 76. Note that the preferred embodiment of the apparatus 60 incorporating mover portion 41 further includes a stationary member 70 having a rotatable connection 74 to the first member 66 between the first 50 and the opposite 80 end of the first member 66, and having a rotatable connection 72 to the second member 68 between the first 48 and the opposite 78 end of the second member 68.

Again referring to FIG. 4, the gripper portion 64 comprises a central member 84 coupled to the linking member 42 with connectors 49 and 51, a first gripper member 86 rotatably coupled to the central member 84 with connector 92, a second gripper member 88 rotatably coupled to the central member 84 with connector 90, first 96 and second 100 pins each having a plurality of grooves and each being coupled to the first gripper member 86, third 94 and fourth 98 pins each having a plurality of grooves and each being coupled to the second gripper member 88, and an actuating portion coupled to the first 86 and second 88 gripper members for moving the first 86 and second 88 gripper members until the first 96, second 100, third 94, and fourth 98 pins grip respective edge portions of the molded leadframe 62 atop the first plurality of molded leadframes 62 in the first magazine (not shown), and for moving the first 86 and second 88 gripper members and the first 96, second 100, third 94, and fourth 98 pins to release the respective edge portions of the molded leadframe 62 when placed atop the second plurality of molded leadframes in the second magazine (not shown). Note that the first 86 and second 88 gripper members are parallel to one another. Additionally, the first 66 and second 68 members of the mover portion 41, as well as their analogous members 44 and 46 in FIG. 3, are also parallel to one another.

Still with reference to FIG. 4, an end portion of the first gripper member 86 and the first pin 96 form a first acute angle, and an opposite end portion of the first gripper member 86 and the second pin 100 form a second acute angle having a magnitude equal to that of the first acute angle. Similarly, an end portion of the second gripper member 88 and the third pin 94 form a third acute angle having a magnitude equal to that of the first acute angle, and an opposite end portion of the second gripper member 88 and the fourth pin 98 form a fourth acute angle having a magnitude equal to that of the third acute angle. One can see the third and fourth acute angles A3 and A4 in FIG. 5A, and the first and second acute angles are analogously formed with respect to the first gripper member 86.

The actuating portion comprises an actuating member 102 rotatably coupled near an end portion 104 and 106 of each of the first 86 and second 88 gripper members, and an actuating member driver portion coupled to the actuating member 102 for moving the actuating member 102 back and forth in a substantially linear motion. Note that the actuating member driver portion is represented by the bi-directional arrow 108 in FIG. 4, and this substantially linear, reciprocating motion can be provided with any one of a number of drivers well known to those skilled in the art such as a pneumatic piston-cylinder driver. Again, note that mover portion 41, or mover portion 40 from FIG. 3, includes only a single driver to move the gripper portion 64 back and forth in the substantially semicircular motion. The bi-directional arrow 91 in FIG. 4 demonstrates only that the gripper portion 64 initially moves up away from and down toward the stack of molded leadframes 62 when it executes its substantially semicircular motion as shown in FIG. 2.

Referring to FIGS. 5 and 5A, a portion of the gripper portion 64 is shown. In particular, in FIG. 5, a simplified planar view of the top of the gripper portion 64 is shown, and in this position, the pins 94, 96, 98, and 100 do not engage a molded leadframe (not shown here). Additionally, in the simplified side planar view of the gripper portion 64 shown in FIG. 5A, one explicitly sees that the pins 94 and 98 of the gripper portion 64 do not engage the molded leadframe 62 sitting atop a stack of molded leadframes 62 in a magazine 110.

A pulling motion, toward the mover portion 40 or 41, of the actuating member 102 provided by the actuating member driver portion (represented by the bi-directional arrow 108 in FIG. 4), causes the first 86 and second 88 gripper members to rotate about their respective connections 92 and 90 to their positions as shown in FIGS. 6 and 6A. FIG. 6 is a simplified planar view of the top of the gripper portion 64. In this position of the gripper portion 64, the pins 94, 96, 98, and 100 engage a molded leadframe 62. In the simplified side planar view of the gripper portion 64 shown in FIG. 6A, one only sees pins 94 and 98 engaged with the molded leadframe 62 sitting atop the stack of molded leadframes 62 in the magazine 110; however, it is apparent from the inherent structure of the gripper portion 64 shown in both FIGS. 6 and 6A that each of the pins 94, 96, 98, and 100 engage the molded leadframe 62. After the mover portion 40 or 41 moves the gripper portion 64 to a position slightly above the stack of molded leadframes in a desired magazine (see FIG. 2) using the substantially semicircular motion previously discussed, the gripper portion 64 releases the molded leadframe. In particular, a pushing motion, away from the mover portion 40 or 41, of the actuating member 102 provided by the actuating member driver portion (represented by the bi-directional arrow 108 in FIG. 4), causes the first 86 and second 88 gripper members to rotate about their respective connections 92 and 90 to their positions as shown in FIGS. 5 and 5A. In this position, the gripper portion 64 has released the molded leadframe onto the stack of molded leadframes in the desired magazine.

OPERATION

Referring to FIG. 3, a perspective view is shown of one embodiment of the mover portion 40 of the instant invention for moving a molded leadframe from one magazine to another in a single, substantially semicircular motion. Note that the apparatus 60 as shown in FIG. 4 includes the preferred embodiment of the mover portion 41 for the apparatus 60, while the mover portion 40 shown in FIG. 3 offers an alternative. The two alternative embodiments for the mover portion 40 and 41 of the apparatus 60 perform the same prime task of moving the gripper portion 64 in a substantially semicircular motion between a pair of magazines holding a stack of molded leadframes.

With reference again to FIG. 3, rotating the shaft 54 back and forth through the semicircular arc of motion causes the first 44 and second 46 members, the linking member 42, and the connected gripper portion 64 (see FIG. 4) to move in a like manner. Note that free rotating connections at 48, 50, 55, and 56 make this possible. Also, in this alternative embodiment of the mover portion 40 and in the preferred embodiment of the mover portion 41 shown in FIG. 4, the linking member 42 and the connected gripper portion 64 have larger planar surface areas that remain essentially parallel with the ground (not shown) and with the top planar surfaces of the molded leadframes in the magazines. In operation, the mover portion 40 places the gripper portion 64 above a first stack of molded leadframes in a first magazine. The gripper portion 64 next closes (see discussion below regarding FIGS. 6 and 6A) to grasp the top molded leadframe. The mover 40 and gripper portions 64 are then driven, by the single driver coupled at shaft 54, in a substantially semicircular motion, thereby positioning the molded leadframe slightly above a second stack of molded leadframes in a second magazine. Then, the gripper portion 64 releases (see discussion below regarding FIGS. 5 and 5A) the molded leadframe atop the second stack of molded leadframes in the second magazine, and the gripper portion 64 is moved back in a substantially semicircular motion to a position slightly above the next molded leadframe in the first stack of molded leadframes in the first magazine. It is important to note again here that the pick up and drop off positions at the first and second magazines remain relatively constant, and this remains true for each embodiment of the apparatus 60 based on indexing schemes, as discussed above. Note here too that when semicircular motion of the mover portion 40 is mentioned, this means, more specifically, that the linking member 42, which is coupled to the gripper portion, moves in the substantially semicircular motion. While other parts of the mover portion 40 also move in a semicircular manner, such as the first 44 and second 46 members and the shaft 54, it is the substantially semicircular motion of the linking member 42 which is of primary concern because this motion ultimately moves the gripper portion 64 and any attached molded leadframe.

Referring to FIG. 4, a perspective view is shown of the instant invention 60 showing both the improved mover 41 and gripper 64 portions together. The mover portion 41 here, as opposed to the mover portion 40 shown in FIG. 3, is the preferred embodiment of the mover portion 41 for the apparatus 60; however, those skilled in the art realize, the alternative embodiment of the mover portion 40 shown in FIG. 3 could be implemented in lieu of the preferred embodiment mover portion 41 in FIG. 4.

Referring to FIG. 4, the linear driver, as represented by the bi-directional arrow 82, moves back and forth in a substantially linear motion, thereby moving the drive member 76 in a like motion. This motion is transferred to a back and forth, substantially semicircular motion of the linking member 42 due to the free-rotating connections at 48, 50, 72, 74, 78, and 80. Given the manner in which the reciprocating, substantially semicircular motion of the mover portion 41 is accomplished, the mover portion 41 first places the gripper portion 64 above a first stack of molded leadframes in a first magazine. The gripper portion 64 next closes (see discussion below regarding FIGS. 6 and 6A) to grasp the top molded leadframe. Part of the mover portion 41 and the gripper portion 64 are then driven, by the single driver coupled to the drive member 76, in a substantially semicircular motion, thereby positioning the molded leadframe slightly above a second stack of molded leadframes in a second magazine. Then, the gripper portion 64 releases (see discussion below regarding FIGS. 5 and 5A) the molded leadframe atop the second stack of molded leadframes in the second magazine, and the gripper portion 64 is moved back in a substantially semicircular motion to a position slightly above the next molded leadframe in the first stack of molded leadframes in the first magazine.

Operation of the gripper portion 64 in FIG. 4 is best described with reference to FIGS. 4–6, including FIGS. 5A and 6A. FIG. 5 shows a simplified planar view of the top of the gripper portion 64. In this position, the pins 94, 96, 98, and 100 do not engage a molded leadframe (not shown here). In the simplified side planar view of the gripper portion 64 shown in FIG. 5A, one explicitly sees that the pins 94 and 98 of the gripper portion 64 do not engage the molded leadframe 62 sitting atop a stack of molded leadframes 62 in a magazine 110.

Referring to FIG. 4, a pulling motion of the actuating member 102, toward the mover portion 40 or 41, provided by the actuating member driver portion (represented by the bi-directional arrow 108), causes the first 86 and second 88 gripper members to rotate about their respective connections 92 and 90 to their positions as shown in FIGS. 6 and 6A. In this position of the gripper portion 64, the pins 94, 96, 98, and 100 engage a molded leadframe 62. In the simplified side planar view of the gripper portion 64 shown in FIG. 6A, one only sees pins 94 and 98 engaged with the molded leadframe 62 sitting atop the stack of molded leadframes 62 in the magazine 110; however, it is apparent that each of the pins 94, 96, 98, and 100 engage the molded leadframe 62. After the mover portion 40 or 41 moves the gripper portion 64 to a position slightly above the stack of molded leadframes in a desired magazine (see FIG. 2) using the substantially semicircular motion previously discussed, the gripper portion 64 releases the molded leadframe. In particular, a pushing motion, away from the mover portion 40 or 41, of the actuating member 102 provided by the actuating member driver portion (represented by the bi-directional arrow 108 in FIG. 4), causes the first 86 and second 88 gripper members to rotate about their respective connections 92 and 90 to their positions as shown in FIGS. 5 and 5A. In this position, the gripper portion 64 has released the molded leadframe onto the stack of molded leadframes in the desired magazine.

Having now described the specific motions of both the mover portions 40 or 41 and the gripper portion 64 of the apparatus 60, the general operation of the apparatus 60 follows. In particular, starting with two stacks of molded leadframes in two separate magazines, the mover portion 40 or 41 moves the gripper portion 64 in a manner previously disclosed to a position slightly above the top molded leadframe in the first magazine. Then, the gripper portion 64 is actuated in the manner previously disclosed to grip the top molded leadframe. Next, the mover portion 40 or 41 moves the gripper portion 64 in the manner previously disclosed to a position slightly above the second stack of molded leadframes in the second magazine. Again, as previously disclosed, the gripper portion 64 releases the molded leadframe, thereby placing it atop the second stack of molded leadframes in the second magazine. Finally and in the manner previously disclosed, the mover portion 40 or 41 returns the gripper portion 64 to a position slightly above the next upper molded leadframe in the first stack of molded leadframes in order to begin the sequence again.

Note that more than two magazines containing a stack of molded leadframes could be integrated with the apparatus 60. All that would be required is to swap one or both of the two aforementioned magazines with one or two other magazines containing stacks of molded leadframes, and the apparatus 60 would operate as indicated above. Note that those skilled in the art could accomplish such a magazine swapping operation in any one of a number of different manners. Lastly, note that those skilled in the art could implement any one of a number of different control schemes or systems to control the operation of the apparatus 60 to be as described above.

Although the invention has been particularly shown and described with reference to a preferred embodiment thereof, it will be understood by those skilled in the art that changes in form and detail may be made therein without departing from the spirit and scope of the invention. Note that in the ideal instance, all four pins 94–100 will grasp a molded leadframe (like 62) substantially simultaneously; however, it is considered within the scope of the instant invention that the pins 94–100 may make contact with and grasp respective edge portions of a molded leadframe like 62 in other than a simultaneous manner. For example, the first 86 and second 88 gripper members could be independently driven using two separate drivers, each operating substantially similar to actuating member 102 and its associated driver 108. In this case the gripper members 86 and 88 could be simultaneously or sequentially driven to pin engagement.

What is claimed is:

1. An apparatus for handling molded leadframes comprising, in combination:

gripper means for grasping a molded leadframe from atop a first magazine holding a first plurality of molded leadframes and for releasing said molded leadframe when placed atop a second plurality of molded leadframes in a second magazine;

mover means coupled to said gripper means for moving said gripper means back and forth in a substantially semicircular motion between said first and second magazines;

said mover means comprising:
  a linking member coupled to said gripper means;
  a first member rotatably coupled at a first end thereof to said linking member;
  a second member rotatably coupled at a first end thereof to said linking member; and
  driver means rotatably coupled to an opposite end of each of said first and second members for moving said gripper means in said back and forth, substantially semicircular motion between said first and second magazines;
said driver means comprising:
  a drive member rotatably coupled to said opposite end of each of said first and second members;
  a linear driver coupled to said drive member for moving said drive member back and forth in a substantially linear motion; and
  a stationary member having a rotatable connection to said first member between said first and said opposite end of said first member, and having a rotatable connection to said second member between said first and said opposite end of said second member.

2. The apparatus of claim 1 wherein said mover means includes only a single driver to move said gripper means back and forth in said substantially semicircular motion.

3. The apparatus of claim 1 wherein said gripper means comprises:
  a central member coupled to said linking member;
  a first gripper member rotatably coupled to said central member;
  a second gripper member rotatably coupled to said central member;
  first and second pins each having a plurality of grooves and each being coupled to said first gripper member;
  third and fourth pins each having a plurality of grooves and each being coupled to said second gripper member; and
  actuating means coupled to said first and second gripper members for moving said first and second gripper members until said first, second, third, and fourth pins grip respective edge portions of said molded leadframe atop said first plurality of molded leadframes in said first magazine, and for moving said first and second gripper members and said first, second, third, and fourth pins to release said respective edge portions of said molded leadframe when placed atop said second plurality of molded leadframes in said second magazine.

4. The apparatus of claim 3 wherein said actuating means comprises:
  an actuating member rotatably coupled near an end portion of each of said first and second gripper members; and
  actuating member driver means coupled to said actuating member for moving said actuating member back and forth in a substantially linear motion.

5. The apparatus of claim 3 wherein an end portion of said first gripper member and said first pin form a first acute angle, and wherein an opposite end portion of said first gripper member and said second pin form a second acute angle having a magnitude equal to that of said first acute angle.

6. The apparatus of claim 5 wherein an end portion of said second gripper member and said third pin form a third acute angle having a magnitude equal to that of said first acute angle, and wherein an opposite end portion of said second gripper member and said fourth pin form a fourth acute angle having a magnitude equal to that of said third acute angle.

7. A method for handling molded leadframes comprising the steps of:
  providing gripper means for grasping a molded leadframe from atop a first magazine holding a first plurality of molded leadframes and for releasing said molded leadframe when placed atop a second plurality of molded leadframes in a second magazine;
  providing mover means coupled to said gripper means for moving said gripper means back and forth in a substantially semicircular motion between said first and second magazines;
  wherein the step of providing said mover means comprises the steps of:
    providing a linking member coupled to said gripper means;
    providing a first member rotatably coupled at a first end thereof to said linking member;
    providing a second member rotatable coupled at a first end thereof to said linking member; and
    providing driver means rotatably coupled to an opposite end of each of said first and second members for moving said gripper means in said back and forth, substantially semicircular motion between said first and second magazines; and
  wherein the step of providing said driver means comprises the steps of:
    providing a drive member rotatably coupled to said opposite end of each of said first and second members; and
    providing a linear driver coupled to said drive member for moving said drive member back and forth in a substantially linear motion; and
  providing a stationary member having a rotatable connection to said first member between said first and said opposite end of said first member, and having a rotatable connection to said second member between said first and said opposite end of said second member.

8. The method of claim 7 wherein the step of providing said gripper means comprises the steps of:
  providing a central member coupled to said linking member;
  providing a first gripper member rotatably coupled to said central member;
  providing a second gripper member rotatably coupled to said central member;
  providing first and second pins each having a plurality of grooves and each being coupled to said first gripper member;
  providing third and fourth pins each having a plurality of grooves and each being coupled to said second gripper member; and
  providing actuating means coupled to said first and second gripper members for moving said first and second gripper members until said first, second, third, and fourth pins grip respective edge portions of said molded leadframe atop said first plurality of molded leadframes in said first magazine, and for moving said first and second gripper members and said first, second, third, and fourth pins to release said respective edge portions of said molded leadframe when placed atop said second plurality of molded leadframes in said second magazine.

9. The method of claim 8 wherein the step of providing said actuating means comprises the steps of:

providing an actuating member rotatably coupled near an end portion of each of said first and second gripper members; and providing actuating member driver means coupled to said actuating member for moving said actuating member back and forth in a substantially linear motion.

10. The method of claim 8 wherein an end portion of said first gripper member and said first pin form a first acute angle, and wherein an opposite end portion of said first gripper member and said second pin form a second acute angle having a magnitude equal to that of said first acute angle.

11. The method of claim 10 wherein an end portion of said second gripper member and said third pin form a third acute angle having a magnitude equal to that of said first acute angle, and wherein an opposite end portion of said second gripper member and said fourth pin form a fourth acute angle having a magnitude equal to that of said third acute angle.

12. An apparatus for handling molded leadframes comprising, in combination:

gripper means for grasping a molded leadframe from atop a first magazine holding a first plurality of molded leadframes and for releasing said molded leadframe when placed atop a second plurality of molded leadframes in a second magazine;

mover means coupled to said gripper means for moving said gripper means back and forth in a substantially semicircular motion between said first and second magazines;

wherein said mover means comprises:
 a linking member coupled to said gripper means;
 a first member rotatably coupled at a first end thereof to said linking member;
 a second member rotatably coupled at a first end thereof to said linking member; and
 driver means rotatably coupled to an opposite end of each of said first and second members for moving said gripper means in said back and forth, substantially semicircular motion between said first and second magazines; and wherein said driver means comprises:
 a stationary drive member rotatably coupled to said opposite end of each of said first and second members;
 a shaft coupled to said opposite end of said first member and extending through an aperture in said stationary drive member; and
 rotational driver means coupled to said shaft for rotating said shaft back and forth through a semicircular arc of motion.

13. The apparatus of claim 12 wherein said mover means includes only a single driver to move said gripper means back and forth in said substantially semicircular motion.

14. The apparatus of claim 12 wherein said gripper means comprises:

a central member coupled to said linking member;

a first gripper member rotatably coupled to said central member;

a second gripper member rotatably coupled to said central member;

first and second pins each having a plurality of grooves and each being coupled to said first gripper member;

third and fourth pins each having a plurality of grooves and each being coupled to said second gripper member; and actuating means coupled to said first and second gripper members for moving said first and second gripper members until said first, second, third, and fourth pins grip respective edge portions of said molded leadframe atop said first plurality of molded leadframes in said first magazine, and for moving said first and second gripper members and said first, second, third, and fourth pins to release said respective edge portions of said molded leadframe when placed atop said second plurality of molded leadframes in said second magazine.

15. The apparatus of claim 14 wherein said actuating means comprises:

an actuating member rotatably coupled near an end portion of each of said first and second gripper members; and actuating member driver means coupled to said actuating member for moving said actuating member back and forth in a substantially linear motion.

16. The apparatus of claim 14 wherein an end portion of said first gripper member and said first pin form a first acute angle, and wherein an opposite end portion of said first gripper member and said second pin form a second acute angle having a magnitude equal to that of said first acute angle.

17. The apparatus of claim 16 wherein an end portion of said second gripper member and said third pin form a third acute angle having a magnitude equal to that of said first acute angle, and wherein an opposite end portion of said second gripper member and said fourth pin form a fourth acute angle having a magnitude equal to that of said third acute angle.

18. A method for handling molded leadframes comprising the steps of:

providing gripper means for grasping a molded leadframe from atop a first magazine holding a first plurality of molded leadframes and for releasing said molded leadframe when placed atop a second plurality of molded leadframes in a second magazine;

providing mover means coupled to said gripper means for moving said gripper means back and forth in a substantially semicircular motion between said first and second magazines;

wherein the step of providing said mover means comprises the steps of:
 providing a linking member coupled to said gripper means;
 providing a first member rotatably coupled at a first end thereof to said linking member;
 providing a second member rotatably coupled at a first end thereof to said linking member; and
 providing driver means rotatably coupled to an opposite end of each of said first and second members for moving said gripper means in said back and forth, substantially semicircular motion between said first and second magazines; and wherein the step of providing said driver means comprises the steps of:
 providing a stationary drive member rotatably coupled to said opposite end of each of said first and second members;
 providing a shaft coupled to said opposite end of said first member and extending through an aperture in said stationary drive member; and providing rotational driver means coupled to said shaft for rotating said shaft back and forth through a semicircular arc of motion.

19. The method of claim 18 wherein the step of providing said gripper means comprises the steps of:

providing a central member coupled to said linking member;

providing a first gripper member rotatably coupled to said central member;

providing a second gripper member rotatably coupled to said central member;

providing first and second pins each having a plurality of grooves and each being coupled to said first gripper member;

providing third and fourth pins each having a plurality of grooves and each being coupled to said second gripper member; and providing actuating means coupled to said first and second gripper members for moving said first and second gripper members until said first, second, third, and fourth pins grip respective edge portions of said molded leadframe atop said first plurality of molded leadframes in said first magazine, and for moving said first and second gripper members and said first, second, third, and fourth pins to release said respective edge portions of said molded leadframe when placed atop said second plurality of molded leadframes in said second magazine.

20. The method of claim 19 wherein the step of providing said actuating means comprises the steps of:

providing an actuating member rotatable coupled near an end portion of each of said first and second gripper members; and providing actuating member driver means coupled to said actuating member for moving said actuating member back and forth in a substantially linear motion.

21. The method of claim 19 wherein an end portion of said first gripper member and said first pin form a first acute angle, and wherein an opposite end portion of said first gripper member and said second pin form a second acute angle having a magnitude equal to that of said first acute angle.

22. The method of claim 21 wherein an end portion of said second gripper member and said third pin form a third acute angle having a magnitude equal to that of said first acute angle, and wherein an opposite end portion of said second gripper member and said fourth pin form a fourth acute angle having a magnitude equal to that of said third acute angle.

23. An apparatus for handling molded leadframes comprising, in combination:

gripper means for grasping a molded leadframe from atop a first magazine holding a first plurality of molded leadframes and for releasing said molded leadframe when placed atop a second plurality of molded leadframes in a second magazine; and mover means coupled to said gripper means for moving said gripper means back and forth in a substantially semicircular motion between said first and second magazines;

said mover means comprising:
a linking member coupled to said gripper means;
a first member rotatably coupled at a first end thereof to said linking member;
a second member rotatably coupled at a first end thereof to said linking member; and
driver means rotatably coupled to an opposite end of each of said first and second members for moving said gripper means in said back and forth, substantially semicircular motion between said first and second magazines;

said driver means comprising:
a drive member rotatably coupled to said opposite end of each of said first and second members; and
a linear driver coupled to said drive member for moving said drive member back and forth in a substantially linear motion;

said apparatus further including a stationary member having a rotatable connection to said first member between said first and said opposite end of said first member, and having a rotatable connection to said second member between said first and said opposite end of said second member;

said gripper means comprising:
a central member coupled to said linking member;
a first gripper member rotatably coupled to said central member;
a second gripper member rotatably coupled to said central member;
first and second pins each having a plurality of grooves and each being coupled to said first gripper member;
third and fourth pins each having a plurality of grooves and each being coupled to said second gripper member; and
actuating means coupled to said first and second gripper members for moving said first and second gripper members until said first, second, third, and fourth pins grip respective edge portions of said molded leadframe atop said first plurality of molded leadframes in said first magazine, and for moving said first and second gripper members and said first, second, third, and fourth pins to release said respective edge portions of said molded leadframe when placed atop said second plurality of molded leadframes in said second magazine;

wherein an end portion of said first gripper member and said first pin form a first acute angle, and wherein an opposite end portion of said first gripper member and said second pin form a second acute angle having a magnitude equal to that of said first acute angle;

wherein an end portion of said second gripper member and said third pin form a third acute angle having a magnitude equal to that of said first acute angle, and wherein an opposite end portion of said second gripper member and said fourth pin form a fourth acute angle having a magnitude equal to that of said third acute angle;

said actuating means comprising:
an actuating member rotatably coupled near an end portion of each of said first and second gripper members; and
actuating member driver means coupled to said actuating member for moving said actuating member back and forth in a substantially linear motion; and wherein said mover means includes only a single driver to move said gripper means back and forth in said substantially semicircular motion.

* * * * *